(12) United States Patent
Lloyd et al.

(10) Patent No.: US 12,671,358 B2
(45) Date of Patent: Jun. 30, 2026

(54) THERMOPHOTOVOLTAIC RECEIVERS COMPRISING EXTRUDED CORES AND INTEGRATED SUBMOUNT ASSEMBLIES SUPPORTING THERMOPHOTOVOLTAIC CELLS

(71) Applicant: Fourth Power, Inc., Cambridge, MA (US)

(72) Inventors: John Lloyd, Portsmouth, RI (US); Brad Siskavich, Nashua, NH (US)

(73) Assignee: Fourth Power, Inc., Cambridge, MA (US)

( * ) Notice: Subject to any disclaimer, the term of this patent is extended or adjusted under 35 U.S.C. 154(b) by 0 days.

(21) Appl. No.: 19/282,526

(22) Filed: Jul. 28, 2025

(65) Prior Publication Data

US 2026/0031755 A1    Jan. 29, 2026

Related U.S. Application Data

(60) Provisional application No. 63/675,822, filed on Jul. 26, 2024.

(51) Int. Cl.
H02S 10/30 (2014.01)
(52) U.S. Cl.
CPC ................................... H02S 10/30 (2014.12)
(58) Field of Classification Search
CPC ...................................................... H02S 10/30
See application file for complete search history.

(56) References Cited

U.S. PATENT DOCUMENTS 4,448,028 A * 5/1984 Chao ...................... H10N 10/13
62/3.3
5,401,329 A * 3/1995 Fraas .................... H10F 77/488
136/246

(Continued)

OTHER PUBLICATIONS

Burger et al. "Present Efficiencies and Future Opportunities in Thermophotovoltaics" Joule—vol. 4, Issue 8, Aug. 19, 2020, pp. 1660-1680—https://www.sciencedirect.com/science/article/pii/S2542435120302841?utm_source=chatgpt.com.

(Continued)

*Primary Examiner* — Devina Pillay
(74) *Attorney, Agent, or Firm* — Polygon IP, LLP

(57) ABSTRACT

Described herein are thermophotovoltaic receivers comprising cores and integrated submount assemblies with thermophotovoltaic cells as well as thermophotovoltaic systems (e.g., energy-storage systems) comprising such receivers. Specifically, a core comprises a set of gas supply channels, a set of gas return channels, a coolant supply channel, and a coolant return channel, such that this core and all channels are formed by extrusion (e.g., aluminum). The core also comprises four faces such that a set of thermophotovoltaic modules is positioned on each face and thermally coupled to the core. The gas channels are used to form sweeping gas curtains over each face and thermophotovoltaic modules, thereby protecting the modules from undesirable condensation deposits. The coolant channels circulate the cooling fluid through the core, thereby maintaining the core and module temperature within the desired temperature ranges. In some examples, modules are equiped with heat sinks, fluidically coupled to the coolant channels.

18 Claims, 8 Drawing Sheets

(56) References Cited

U.S. PATENT DOCUMENTS

| 6,065,418 A * | 5/2000 | Goldstein | ............... H02S 10/30 |
| | | | 136/253 |
| 10,465,995 B1 | 11/2019 | Henry | |
| 11,159,119 B2 | 10/2021 | Henry | |
| 12,276,282 B2 | 4/2025 | Hvasta et al. | |
| 2017/0229995 A1 | 8/2017 | Hubert et al. | |
| 2017/0229996 A1* | 8/2017 | Hubert | ................. H02S 40/425 |
| 2024/0247723 A1 | 7/2024 | Hvasta et al. | |
| 2024/0247741 A1 | 7/2024 | Hvasta et al. | |

OTHER PUBLICATIONS

Kelsall, "Design Challenges for Ultra-High-Temperature Energy Storage with Thermophotovoltaics" PhD Thesis, Feb. 2023—https://dspace.mit.edu/handle/1721.1/150104.

* cited by examiner

100

102    104    114   120   112

110   106   120   120   114

TPV Can Be Retracted

120

121

140

130

170

170

140

140

140

Laminar Flow
of Inert Gas

Cutout Area 170
150
172
174
176
178
181
182
184
180
190
192

Cutout Area 150
152
154
156
158
160
162
164

THERMOPHOTOVOLTAIC RECEIVERS COMPRISING EXTRUDED CORES AND INTEGRATED SUBMOUNT ASSEMBLIES SUPPORTING THERMOPHOTOVOLTAIC CELLS

CROSS-REFERENCE TO RELATED APPLICATIONS

This application claims the benefit under 35 U.S.C. § 119(e) of U.S. Provisional Patent Application 63/675,822, filed on 2024 Jul. 26, which is incorporated herein by reference in its entirety for all purposes.

BACKGROUND

Thermophotovoltaics (TPV) are a class of heat engines that exploit the photovoltaic effect to convert radiant light from a heated body into electricity. Given sufficient reductions in cost and increases in power conversion efficiency, TPV generators could replace internal combustion or turbine engines in many applications. Similarly, TPV generators could recover industrial waste heat from certain processes to improve efficiency. These same advancements in TPV technology are enabling new applications such as energy storage.

It is often desirable to operate TPV systems or, more specifically, TPV emitters at very high temperatures, e.g., above 1500° C. or even above 1900° C. The total power radiated per unit area of a TPV emitter ("blackbody" in Stefan-Boltzmann Law) is proportional to the fourth power of the temperature $P \propto T^4$. Thus, higher temperatures lead to significantly higher radiative power. Higher temperatures also shift the peak of the emitted spectrum towards shorter wavelengths (per Wien's Displacement Law). This shift is more suitable for photovoltaic conversion if the bandgap of the TPV cells (on a TPV receiver) is appropriately matched, thereby maximizing the absorption and conversion efficiency, which may be as high as 30% and even as high as >50%. Finally, some industrial processes may generate high-temperature waste heat that can be harnessed using TPV systems, providing a practical application for energy recovery.

Unfortunately, various components of TPV receivers or, more specifically, of TPV cells are temperature-sensitive and are unable to operate at such high temperatures. For example, some components need to be maintained at a temperature of less than 100° C., which is significantly lower than the temperature of TPV emitters (e.g., greater than 1500° C. or even greater than 1900° C.). As a result, these TPV cells may require active cooling. Furthermore, the surrounding environment may include various volatile components (at such high temperatures of the environment). These volatile components are typically prone to deposit on cooler surfaces, such as TPV receivers.

What is needed are TPV receivers utilizing TPV cores and integrated submount assemblies with TPV cells that enable low-temperature operations of these cells.

SUMMARY

Described herein are thermophotovoltaic receivers comprising cores and integrated submount assemblies with thermophotovoltaic cells as well as thermophotovoltaic systems (e.g., energy-storage systems) comprising such receivers. Specifically, a core comprises a set of gas supply channels, a set of gas return channels, a coolant supply channel, and a coolant return channel, such that this core and all channels are formed by extrusion (e.g., aluminum). The core also comprises four faces such that a set of thermophotovoltaic modules is positioned on each face and thermally coupled to the core. The gas channels are used to form sweeping gas curtains over each face and thermophotovoltaic modules, thereby protecting the modules from undesirable condensation deposits. The coolant channels circulate the cooling fluid through the core, thereby maintaining the core and module temperature within the desired temperature ranges. In some examples, modules are equipped with heat sinks, fluidically coupled to the coolant channels.

Clause 1. A thermophotovoltaic (TPV) receiver having a primary axis, the TPV receiver comprising: a TPV core, wherein: the TPV core comprises a set of gas supply channels, a set of gas return channels, a coolant supply channel, and a coolant return channel, each extending along the primary axis, and the TPV core further comprises core faces, each extending substantially parallel to the primary axis; and TPV modules, each attached to one of the core faces, wherein: each of the TPV modules comprises a heat sink and a TPV integrated submount assembly, the heat sink faces the TPV core and comprises an internal coolant channel fluidically coupled to the coolant supply channel and a coolant return channel, and the TPV integrated submount assembly comprises TPV cells.

Clause 2. The TPV receiver of clause 1, wherein the TPV integrated submount assembly further comprises an integrated submount comprising thermally-conductive pads thermally coupled to TPV cells.

Clause 3. The TPV receiver of clause 2, wherein the TPV integrated submount assembly further comprises a dielectric layer supporting the thermally-conductive pads.

Clause 4. The TPV receiver of clause 3, wherein the TPV integrated submount assembly further comprises a metal core supporting the dielectric layer and attached to the heat sink.

Clause 5. The TPV receiver of clause 2, wherein: each of the TPV cells comprises a mechanical handle having a thermal conductance of at least 200 W/m-K, and the mechanical handle is bonded to the integrated submount.

Clause 6. The TPV receiver of clause 5, wherein the mechanical handle has a thickness of at least 50 micrometers.

Clause 7. The TPV receiver of clause 5, wherein the mechanical handle is bonded to the thermally-conductive pads of the integrated submount.

Clause 8. The TPV receiver of clause 1, wherein: the TPV core comprises a set of coolant supply ports and a set of coolant return ports, extending substantially perpendicular to the primary axis, each of the set of coolant supply ports extends between and fluidically couples the coolant supply channel and the internal coolant channel of the heat sink of each of the TPV modules, and each of the coolant return ports extends between and fluidically couples the coolant return channel and the internal coolant channel of the heat sink of each of the TPV modules.

Clause 9. The TPV receiver of clause 8, wherein each fluidical coupling between the internal coolant channel and one of the set of coolant supply ports and the set of coolant return ports is formed by a rubber gasket shielded from the environment by a corresponding one of the TPV modules.

Clause 10. The TPV receiver of clause 1, wherein the TPV core is formed from extruded aluminum.

Clause 11. The TPV receiver of clause 1, wherein each of the set of gas supply channels, the set of gas return channels, the coolant supply channel, and the coolant return channel is formed from extruding the TPV core.

Clause 12. The TPV receiver of clause 1, further comprising gas directors, wherein: each attached to a corresponding corner of the TPV core such that each of the TPV modules is positioned between two of the gas directors, a first one of the two of the gas directors is fluidically coupled to one in the set of gas supply channels, and a second one of the two of the gas directors is fluidically coupled to one in the set of gas return channels.

Clause 13. The TPV receiver of clause 12, wherein two of the gas directors are configured to generate a laminar flow over the TPV cells of a corresponding one of the TPV modules.

Clause 14. The TPV receiver of clause 13, wherein each of the gas directors is configured to generate the laminar flow over the TPV cells of at least two of the TPV modules positioned on different ones of the core faces.

Clause 15. The TPV receiver of clause 12, wherein each of the gas directors is configured to interlock with the corresponding corner of the TPV core.

Clause 16. The TPV receiver of clause 12, wherein each of the gas directors comprises a set of gas direction channels offset relative to each other along the primary axis.

Clause 17. The TPV receiver of clause 1, wherein each of the core faces supports two or more of the TPV modules arranged along the primary axis.

Clause 18. The TPV receiver of clause 1, further comprising a leading zone and a tailing zone, offset relative to the leading zone along a longitudinal axis, wherein: the TPV modules comprises a first set of TPV cells positined at the leading zone, the TPV modules further comprises a second set of TPV cells positined at the tailing zone and offset relative to the first set of TPV cells along the longitudinal axis, and the second set of TPV cells has a lower bandgap than the first set of TPV cells.

Clause 19. The TPV receiver of clause 18, wherein: the second set of TPV cells has a bandgap between 0.3-0.8 eV, and the first set of TPV cells has a bandgap greater than 1 eV.

Clause 20. A method of operating a TPV system comprising a TPV receiver and a radiation device, the TPV receiver comprising a TPV core and a TPV modules arranged on the TPV core and thermally coupled to the TPV core, the method comprising: flowing a coolant through a coolant supply channel and a coolant return channel in the TPV core to remove heat from the TPV modules; directing an inert gas across the TPV modules using gas directors positioned at corners of the TPV core, wherein the inert gas forms a gas curtain over the TPV modules thereby blocking volatile deposition on the TPV modules; and inserting the TPV receiver into a cavity of the radiation device, wherein: the radiation device is heated to a temperature of at least 1500° C. thereby emitting radiation within the cavity of the radiation device, and the TPV modules absorbs at least a portion of the radiation thereby producing electrical power.

Clause 21. The method of clause 20, wherein the radiation device is heated to a temperature between 1900° C. and 2500° C.

Clause 22. The method of clause 20, wherein the TPV system further comprises a storage unit, and the radiation device is heated by circulating a liquid metal through the storage unit and the radiation device.

Clause 23. The method of clause 20, wherein the coolant is a liquid selected from the group consisting of water, oil, and a glycol-based mixture.

Clause 24. The method of clause 20, wherein the coolant is supplied into the TPV receiver at a temperature below 40° C.

Clause 25. The method of clause 20, wherein the inert gas comprises argon.

Clause 26. The method of clause 20, wherein: the gas directors comprises a first gas director and a second gas director, positioned on adjacent corners of the TPV core, the TPV core comprises a gas supply channel and a gas return channel, the gas supply channel supplies the inert gas to the first gas director, the gas return channel removes the inert gas received at the second gas director, and the inert gas flows across a subset of the TPV modules positioned between the first gas director and the second gas director.

Clause 27. The method of clause 26, wherein: the gas supply channel is maintained at a pressure higher than ambient, and the gas return channel is maintained at a pressure lower than ambient, thereby establishing a directional flow across the subset of the TPV modules.

Clause 28. The method of clause 20, wherein: each of the TPV modules comprises a heat sink and a TPV integrated submount assembly, the heat sink faces the TPV core and comprises an internal coolant channel fluidically coupled to the coolant supply channel and a coolant return channel, and the TPV integrated submount assembly comprises TPV cells.

Clause 29. The method of clause 20, wherein the coolant is supplied to and removed from the TPV receiver via coolant hoses comprising a flexible core, a thermal shield, and an external reflective skin.

Clause 30. The method of clause 20, wherein flowing the coolant and directing the inert gas is initiated before inserting the TPV receiver into the cavity of the radiation device and continues while the TPV receiver remains inserted in the cavity of the radiation device.

Clause 31. The method of clause 20, wherein directing the inert gas operation further comprises regulating a gas flow velocity to minimize turbulence and maintain a substantially uniform laminar gas curtain across the TPV modules.

Clause 32. The method of clause 20, wherein the TPV modules are maintained at a temperature below 45° C. while the TPV receiver is inserted into the cavity of the radiation device.

Clause 33. The method of clause 20, further comprising measuring temperature at one or more locations of the TPV receiver and controlling a flow rate of the coolant based on the temperature measured at the one or more locations of the TPV receiver.

BRIEF DESCRIPTION OF THE DRAWINGS

The included drawings are for illustrative purposes and serve only to provide examples of possible structures and operations for the disclosed inventive systems, apparatus, and methods. These drawings in no way limit any changes in form and detail that may be made by one skilled in the art without departing from the spirit and scope of the disclosed implementations.

DETAILED DESCRIPTION

Introduction

As noted above, high temperatures, e.g., above 1500° C. or even above 1900° C., are highly beneficial for the efficient operation of TPV systems. However, various components of TPV receivers (e.g., TPV cell components, gaskets, etc.) need to be maintained at low temperatures (e.g., below 100° C. or even below 50° C.) to prevent thermal damage to these components. It should be noted that the high-temperature component and low-temperature components need to operate within close proximity. Furthermore, condensation or frosting of volatile components (present in the hot environment) on the colder components needs to be minimized to prolong the operating life of these components.

TPV receivers, described herein, address these problems using various design features of the TPV cores and TPV modules. For example, a TPV core may comprise a set of gas supply channels and a set of gas return channels that are used to form gas screens in front of each face of the TPV receiver, thereby protecting the TPV modules in each face from condensation. Furthermore, a TPV core may comprise a coolant supply channel and a coolant return channel for circulating the coolant through the TPV core. The modules are thermally coupled to the TPV core. In some examples, the coolant channels may flow coolant in and out of each TPV module (e.g., the heat sink provided on the back of each module) thereby maintaining various components of the TPV module at the desired temperature, e.g., less than 100° C. or even less than 500° C. (while other components proximate to the TPV module are at 1200-2800° C. or, more specifically, 1500-2500° C.). The gas channels may form a substantially laminar or turbulent flow of inert gas (e.g., argon) over the front of each TPV module (e.g., over the TPV cells), thereby shielding the module front from volatile components, while this module front is maintained at a temperature substantially lower than the environment.

TPV Systems

Figure 1A:
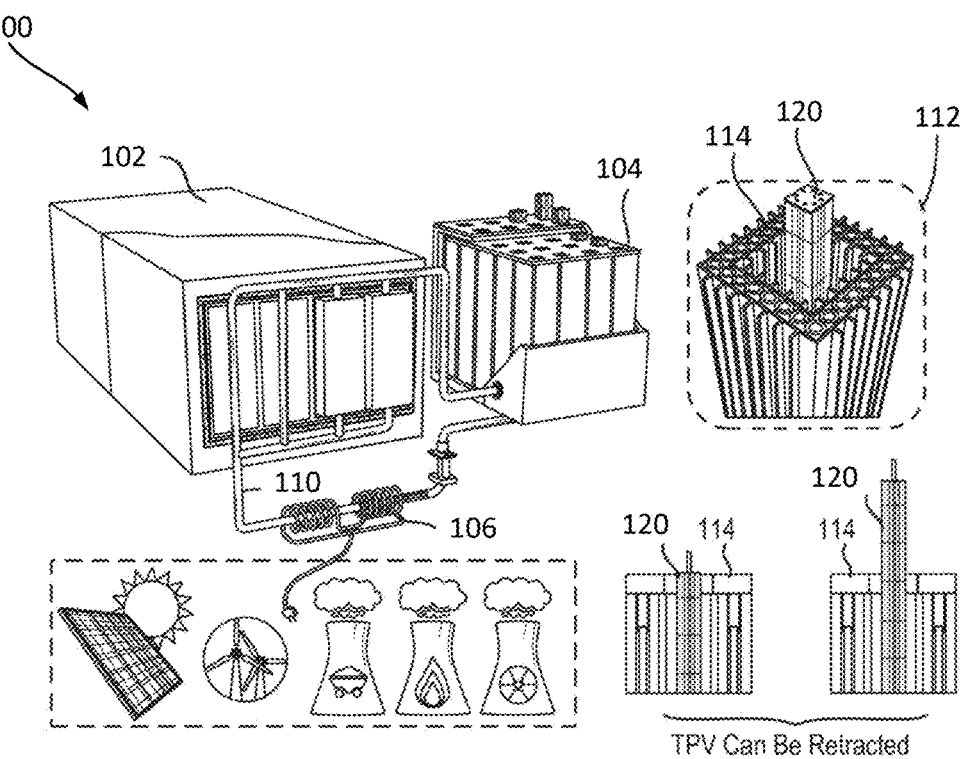
FIG. 1A is a schematic illustration of a thermal system (e.g., a thermal energy-storage system) comprising a set of TPV receivers positioned in the cavities of a TPV emitter, in accordance with some examples.

Various examples of TPV systems are within the scope, such as thermal energy-storage systems, thermal generators, and the like. FIG. 1A is a schematic illustration of a TPV system 100 in the form of a thermal energy-storage system (interchangeably referred to herein as a thermal battery), in accordance with some examples. FIG. 1E is a corresponding block diagram. In this example, the TPV system 100 comprises a storage unit 102, formed from a set of graphite blocks. The size and the number of these blocks determine, at least in part, the thermal capacity of the storage unit 102 and, more generally, of the TPV system 100. For example, the size of storage unit 102 can be 1,000-10,000 m$^3$, while the size of each block may be 0.5-5 m$^3$. The TPV system 100 may further comprise a power block 104 and a piping infrastructure 110 in which a liquid metal (e.g., Sn) may flow between the storage unit 102 and the power block 104 for heat transfer. The TPV system 100 may include heating element 106 that may be configured to heat up the liquid metal in the piping infrastructure 110.

A TPV system 100 exploits the fact that thermal radiation scales with absolute temperature to the fourth power (P∝T$^4$), in order to achieve high power density and consequently low cost. In concept, the TPV system 100 may operate by taking in electricity (e.g., from renewables) to power heating elements 106 (e.g., resistive heaters) to a temperature of 1200-2800° C. or, more specifically, 1500-2500° C. The heating elements 106 convert the electricity into extremely high-temperature heat, which is then transferred to a power block 104 using a piping infrastructure 110 (e.g., a plumbing network made of graphite that carries liquid tin). The tin is mechanically pumped in the piping infrastructure 110 (forming a circulation loop). When the tin flows adjacent to the heating elements 106, the tin may nominally heat from the incoming lower temperature (e.g., 1900° C.) to an outgoing higher temperature (e.g., 2400° C.). At this higher temperature, the molten tin is then routed to storage unit 102 (e.g., a bank of energy storage blocks (ESBs) made of carbon or graphite). As the liquid metal passes through pipes situated in between gaps in the blocks, the ESBs are heated to the peak temperature to fully charge the TPV system 100. The storage unit 102 (ESBs) is thermally insulated from the surroundings and can hold the thermal energy for long periods of time (i.e., weeks to months) if needed. When electricity is desired back on the grid, the heating elements 106 are turned off, and the liquid metal is used to carry the sensible heat from the storage unit 102 (ESBs) over to a TPV power block 104. The TPV power block 104 comprises a radiation device 114 with individual cavities that have the liquid metal flowing through its walls, which keep the walls hot. The walls emit light that is then absorbed by the TPV receiver 120 or, more specifically, by the TPV cells 150 and produces electricity (e.g., provided back to the grid).

Overall, the power block 104 is equipped with an array of TPV units 112. Each TPV unit 112 is configured to convert thermal energy (provided by the storage unit 102) into electricity via a combination of heat radiation and photoelectric effects. Each TPV unit 112 comprises a radiation device 114 (which may be referred to as a TPV emitter) and a TPV receiver 120. As noted above, the radiation device 114 may comprise a set of pipes for pumping a thermal fluid (e.g., molten tin), thereby heating the radiation device 114 and producing the radiation, which is then converted by the TPV receiver 120 into electricity. In some examples, the TPV receiver 120 may be retracted (or removed) from the cavity in the radiation device 114 and may be referred to as a TPV "stick" because of its extended shape.

Overall, a TPV receiver 120 is configured to operate proximate to a radiation device 114 (i.e., positioned into the cavity of the radiation device 114) while the radiation device 114 is heated to a temperature of 1600-2500° C. or, more specifically, 1900-2500° C. It should be noted that other TPV applications do not involve such high temperatures and do not incur such large heat fluxes or penalties associated with inactive areas.

TPV Receivers

Figure 1B:
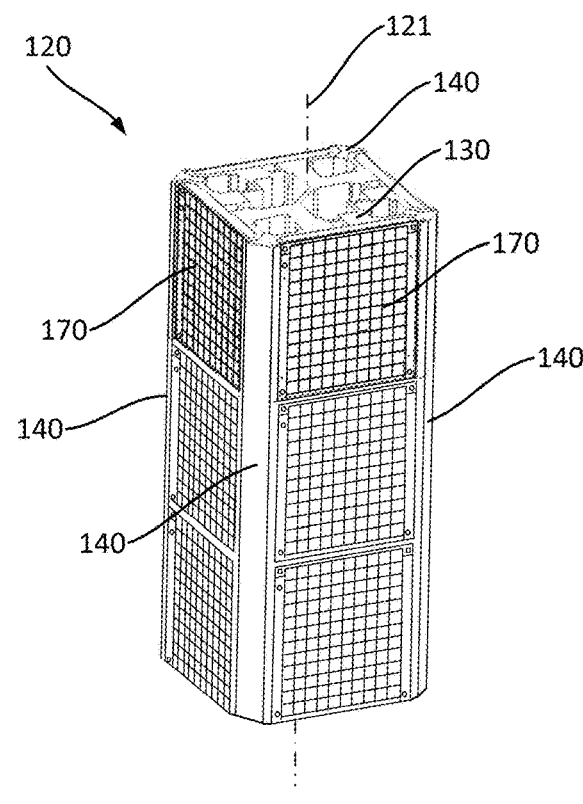
FIGS. 1B and 1C are schematic cross-sectional views of one TPV receiver (used in the thermal energy-storage system of FIG. 1A), in accordance with some examples.

Referring to FIG. 1B, each TPV receiver 120 comprises a set of TPV modules 170 arranged on the four faces of the TPV receiver 120. When the TPV receiver 120 is positioned into the cavity of the radiation device 114, the TPV modules 170 face the radiation device 114. Each face of the TPV receiver 120 may include one or more TPV modules 170, e.g., multiple TPV modules 170 arranged along the primary axis 121 of the TPV receiver 120.

The TPV receiver 120 may also comprise a TPV core 130, providing support to the TPV modules 170 and delivering coolant and gas to each TPV module 170 as further described below. The TPV core 130 may also house one or multiple busbars connected to each TPV module 170 to carry the electric current among TPV modules 170 and also between the TPV modules 170 and external components. In some examples, the TPV core 130 may be made from a conductive material and may be operable as one of the busbars. Alternatively, the TPV core 130 may be used as a common ground. Furthermore, the channels (e.g., used to house the busbar(s)) can also be used to house other metrology that can be used to measure temperature, pressure, voltage, current, resistance, or other parameters that assess the state of the system. The TPV receiver 120 or, more specifically, the TPV core 130 keeps the busbars and/or metrology equipment from direct irradiation from the high temperature emitter (thereby preventing these components from overheating). It should be noted that the TPV receiver 120 is positioned in the environment with high thermal radiation, and keeping the component at low temperatures (in this environment) is challenging. The TPV core 130 is operable as a heat sink (with active cooling) and thermal shield (for components provided inside the TPV core 130).

The TPV receiver 120 may comprise gas directors 140 positioned at the corners of the TPV core 130 and supported by the TPV core 130. The gas directors 140 may be configured to generate a laminar or turbulent flow across the face of each TPV module 170 (e.g., the flow direction being perpendicular to the primary axis 121, or otherwise). This flow shields the face of each TPV module 170 (e.g., from volatile components in the environment condensing or frosting onto its surfaces), and it also cools this face. The width of the TPV receiver 120 (i.e., the distance between two adjacent gas directors 140) and the size of the TPV module 170 in this direction may be selected such that the flow remains attached, or detaches as a desirable location.

Figures 1C, 1D:
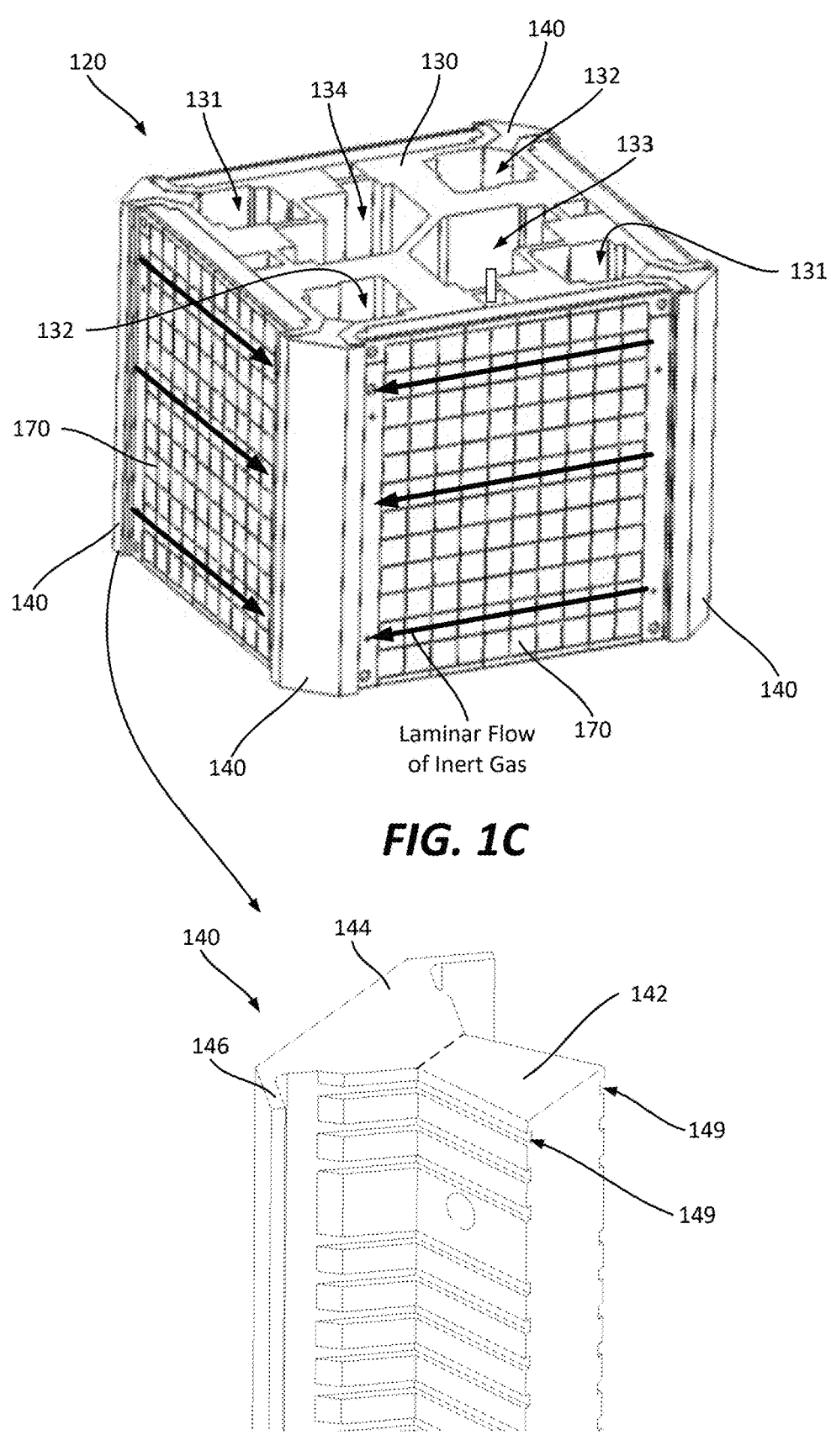
FIG. 1D is a schematic view of one gas director of the TPV receiver in FIGS. 1B and 1C, in accordance with some examples.
Figure 1E:
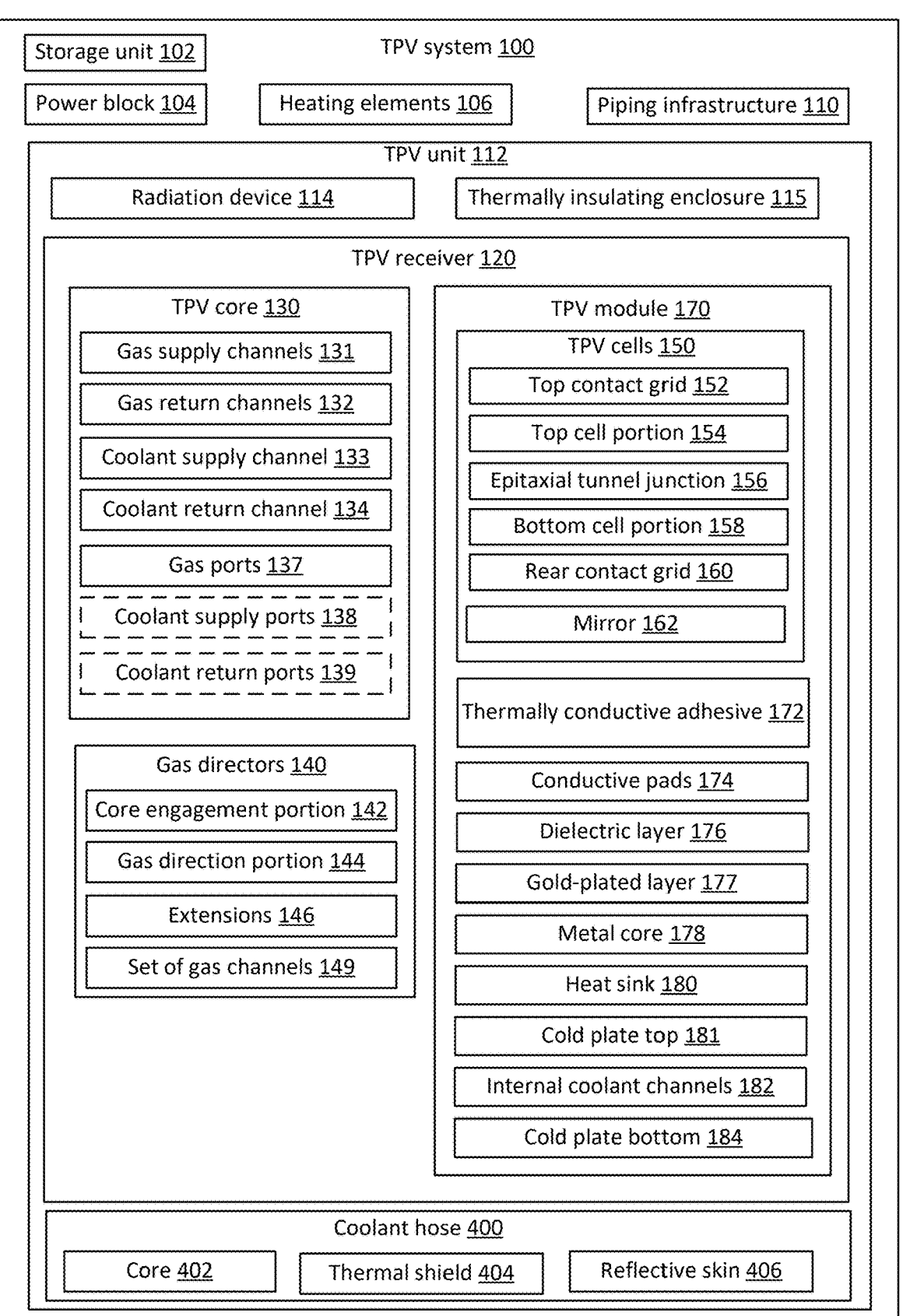
FIG. 1E is a block diagram of the thermal system in FIG. 1A, in accordance with some examples.

FIG. 1C is a more detailed cross-sectional view of a TPV receiver 120 illustrating various internal components of the TPV receiver 120, in accordance with some examples. As noted above, a TPV receiver 120 comprises a TPV core 130 and TPV modules 170, mounted to and supported by the TPV core 130. The TPV core 130 may be operable as a heat sink and is actively cooled (in addition to providing electrical connections, cooling, and gas shielding functions to the TPV modules 170), to prevent the TPV modules 170 from overheating. More specifically, each TPV module 170 comprises a set of components that interface the TPV core 130 and provide the attachment and cooling of the TPV module 170. This set of components may be referred to as a TPV module submount or, more specifically, a TPV integrated submount. Further aspects of this integrated submount are described below with reference to FIG. 2A.

Figure 2A:
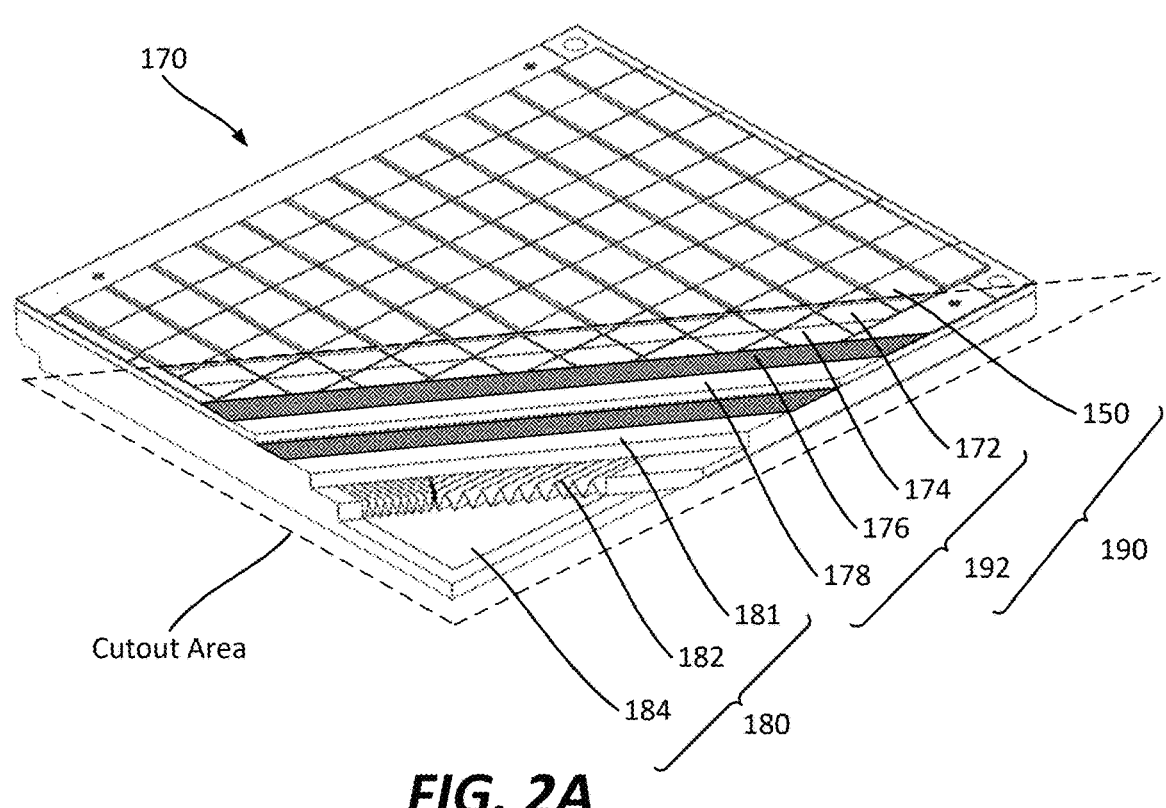
FIG. 2A is a schematic partial cross-sectional view of a TPV cell, in accordance with some examples.

A TPV module 170 is a modular element of a TPV receiver 120 that physically supports an array of TPV cells 150, e.g., as schematically shown in FIG. 2A. The TPV module 170 and, more generally, the corresponding TPV receiver 120 provides mechanical, electrical, and thermal interconnection of each TPV cell 150 to the overall TPV system 100.

Referring to FIG. 1D, in some examples, a gas director 140 comprises a core engagement portion 142 and a gas direction portion 144, which are monolithic with each other (e.g., formed from the same extruded component). The gas direction portion 144 comprises extensions 146, each being parallel to the corresponding TPV module 170 and, therefore, perpendicular to each other. The core engagement portion 142 and gas direction portion 144 comprise two sets of gas channels 149, one set on each side of the gas directors 140. The gas channels in each set of gas channels 149 are offset from each other along the primary axis 121. Furthermore, the gas channels in each set of gas channels 149 form a fluidic coupling between one of the gas supply channels 131 or the gas return channels 132 and the face of the corresponding TPV module 170.

TPV Modules

Referring to FIG. 2A, a TPV module 170 comprises a group or, more specifically, an array of TPV cells 150 that have been connected together electrically (i.e., either in series, parallel, or some combination thereof). For example, FIG. 2A illustrates an example with 120 TPV cells arranged into a 2-dimensional array. These TPV cells 150 are physically bonded or adhered to an integrated submount 192, collectively forming a TPV integrated submount assembly 190. The integrated submount 192 provides a high-thermal conductance connection while simultaneously electrically isolating the photovoltaic circuit from the ground. The TPV integrated submount assembly 190 is attached to a heat sink 180, collectively forming a TPV module 170, which is a handleable structure for subsequent mounting and connection to TPV cores 130. The heat sink 180 may be actively cooled as further described below.

An integrated submount 192 may be in various forms, e.g., a metal core printed circuit board (MCPCB). A MCPCB has a low thermal resistance (in the z-direction/stacking direction) which would be the primary direction of heat flow for cooling, while also providing electrical isolation and a means of transporting power through the z-direction behind the TPV cells. Specifically, an integrated submount 192 (e.g., in the form of an MCPCB) comprises (1) a metal core 178, (2) a dielectric layer 176, and (3) conductive pads 174 (e.g., copper pads). In some examples, the conductive pads 174 are plated with a desired coating (such as gold) to facilitate wire bonding connections and reduce optical absorption in exposed areas. The first layer is a metal core 178, e.g., formed from aluminum or copper. The second layer is an electrically insulating dielectric layer 176 (e.g., having a thermal conductivity of at least 1 W/mK, at least 5 W/mK, or even at least 10 W/mK.

The third layer comprises conductive pads 174 (e.g., formed from copper). The metal core 178 provides mechanical stability and lateral thermal conductance. The dielectric layer 176 electrically isolates the active photovoltaic circuits. The conductive pads 174 provide a bonding site for the TPV cells 150 and routing of the electrical circuit.

The metal core 178 is useful for reducing the thermal resistance of the stack of materials. The dielectric layer 176 provides electrical isolation between the front and back sides of the integrated submount 192 (e.g., an MCPCB). Specifically, TPV cells 150 can be electrically connected to the front face, while the back face could be used to make a high-fidelity, thermally/electrically conductive metal connection (provided by the integrated submount 192) to the heat sink 180. The conductive pads 174 (e.g., that can be plated on the front or back side of the MCPCB) allow for the TPV cells 150 to be closely packed together, e.g., as schematically shown in FIGS. 2C and 2D. The close packing reduces the amount of exposed inactive areas, which are a source of loss and inefficiency (and can be potentially damaged). It should be noted that large-area TPV cells are not desirable, since the current generated would exceed the capacity of facile electrical contacting conductors, while the module voltage would be low. Instead, multiple smaller TPV cells are connected in series to achieve a higher voltage and lower current while causing gaps between adjacent cells. An integrated submount 192 (e.g., MCPCB) described herein facilitates all of the above goals, resulting in minimal efficiency losses, whilst also keeping costs low, due to its already widespread high volume usage. However, other options are also within the scope.

Referring to FIG. 2A, in some examples, conductive pads 174 are arranged in a densely packed grid, with a gap between pads to allow for electrical isolation between adjacent cells and to accommodate pick and place and die bonding tolerances. In some examples, the width of the gap is less than 200 micrometers. Such a minimal gap allows for minimizing wire-bond lengths and also maximizes the ratio of active TPV cell area to total module area.

Overhang Examples

In some examples, the spacing/gap between TPV cells 150 is 25-100 micrometers or, more specifically, 25-75 micrometers or even 25-50 micrometers. This spacing is smaller than the minimum spacing between the conductive pads 174 due to the resolution of the conductive pads/copper layer fabrication processes. The conductive pads 174 are slightly undersized (e.g., by 50-200 micrometers) relative to the TPV cells 150 so that the TPV cells 150 overhang the edge of the conductive pads 174 and reduce the effective inactive area exposed to thermal radiation, as, e.g., schematically shown in FIG. 2C. For example, if the minimum width between conductive pads 174 is 150 micrometers, then the conductive pads 174 will be 100 micrometers narrower than the TPV cells 150. As a result, the TPV cell will overhang the edge of the pad by 50 micrometers. The goal is to reduce the inactive area in between the TPV cells 150 to a small fraction of the total exposed area, while simultaneously maintaining electrical isolation. For example, 1 cm×1 cm TPV cells 150 may be positioned with a 100-micrometer isolation border between adjacent cells; then, the effective inactive area is less than ~2% of the total exposed area. Such a range, i.e., <5% inactive area between cells, is therefore useful in minimizing parasitic absorptive losses. Overall, in some examples, the effective inactive area is less than 5%, less than 2%, less than 1% or even less than 0.2%.

This overhang is the reason for the high thermal conductance of the mechanical handle 164, i.e., to avoid hotspots or thermal damage to the edge of the TPV cells 150 not directly above the MCPCB pad.

In some examples, the MCPCB stack has only one layer of conductive pads 174 and a dielectric layer 176 (such that the metal core 178 is not present). In these examples, the dielectric layer 176 directly interfaces with the heat sink 180. This minimizes the thermal resistance between the TPV cell and the heat exchanger, which provides active cooling.

In some examples, the dielectric layer 176 is removed between the conductive pads 174. The underlying metal core 178 may be covered with a gold-plated layer 177 to increase the optical reflectivity and minimize parasitic optical absorption, e.g., as shown in FIG. 2D.

In other examples, where the dielectric layer 176 cannot be removed for cost or process limitation reasons, the overhanging of the TPV cells 150 acts to reduce the total flux on the exposed dielectric and prevent thermal damage.

TPV Integrated Submount Assemblies

Overall, a TPV integrated submount assembly 190 is initially formed by adhering the TPV cells 150 to the integrated submount 192, e.g., using a thermally conductive adhesive 172. A thermally conductive adhesive 172 may be used in between the TPV cells 150 and TPV integrated submount assembly 190. The thermally conductive adhesive 172 may be an epoxy or other suitable material and/or have a thermal conductivity of at least 1 W m$^{-1}$ K$^{-1}$, at least 5 W m$^{-1}$ K$^{-1}$, or even at least 10 W m$^{-1}$ K$^{-1}$. In some examples, a similar or the same thermally conductive adhesive 172 is used between the TPV integrated submount assembly 190 and the heat sink 180.

The TPV integrated submount assembly 190 is then bonded/adhered to a heat sink 180. The heat sink 180 has a large amount of surface area (e.g., formed by internal coolant channels 182) for heat transfer.

It should be noted that the cooling load/heat fluxes through the TPV cells 150 could be quite high, e.g., greater than 1 W/cm$^2$, possibly approaching or exceeding 200 W/cm$^2$ under some conditions. To ensure the TPV cells 150 stay cold (e.g., near room temperature (nominally <45° C.), a liquid coolant may be used (e.g., circulated through the heat sink 180) to remove the heat. Yet still, even with a highly effective liquid coolant such as water, it is still important to have a large amount of surface area for heat transfer, thereby necessitating milli- or micro-channeled structures within the heat sink 180.

The design of a TPV integrated submount assembly 190 ensures maximum performance and minimum cost. In some examples, each TPV receiver 120 is approximately 10 cm×10 cm in cross-section and 3 meters long, providing a reference dimension. Each individual TPV cell 150 is approximately 1 cm×1 cm. An array of 120 TPV cells 150 is arranged into a TPV module 170, with multiple TPV modules 170 arranged on the faces of the TPV receiver 120. In each TPV module 170, the TPV cells 150 may be strung together in series with wire bonds between them provided by a TPV integrated submount assembly 190. Specifically, the TPV integrated submount assembly 190 comprises conductive pads 174, a dielectric layer 176, and a metal core 178. The TPV cells 150 are bonded to the conductive pads 174 with a thermally conductive adhesive 172 (e.g., a conductive epoxy). The TPV integrated submount assembly 190 is bonded to a heat sink 180 comprising a cold plate top 181 and a cold plate bottom 184, forming internal coolant channels 182 (e.g., milli/microchannels) for circulation of the liquid coolant. The heat sink 180 or, more specifically, the cold plate bottom 184, comprises a 1.5-cm diameter inlet and outlet interface.

The liquid coolant connections on the back of the cold plate bottom 184 (e.g., for connecting to the ports/channels in the TPV core 130) can use rubber O-ring seals because they are hidden from direct irradiation from the intense light by the TPV module 170. This approach of hiding connections from the light source (i.e., the hot cavity) is an important feature of the design, as it allows components that are not associated with the conversion of light to electricity to be hidden from intense irradiation. As a result, the options for what materials are used and their corresponding optical properties are relaxed, since the optical properties become irrelevant in such a novel geometric configuration. Furthermore, radial o-ring seals can be utilized to maximize longevity and decouple the module retention force resulting from fasteners and the seal compression forces. Additionally, direct bonding (e.g., using a polymer) may be used either as a primary or redundant backup seal.

TPV Cells

Figure 2B:
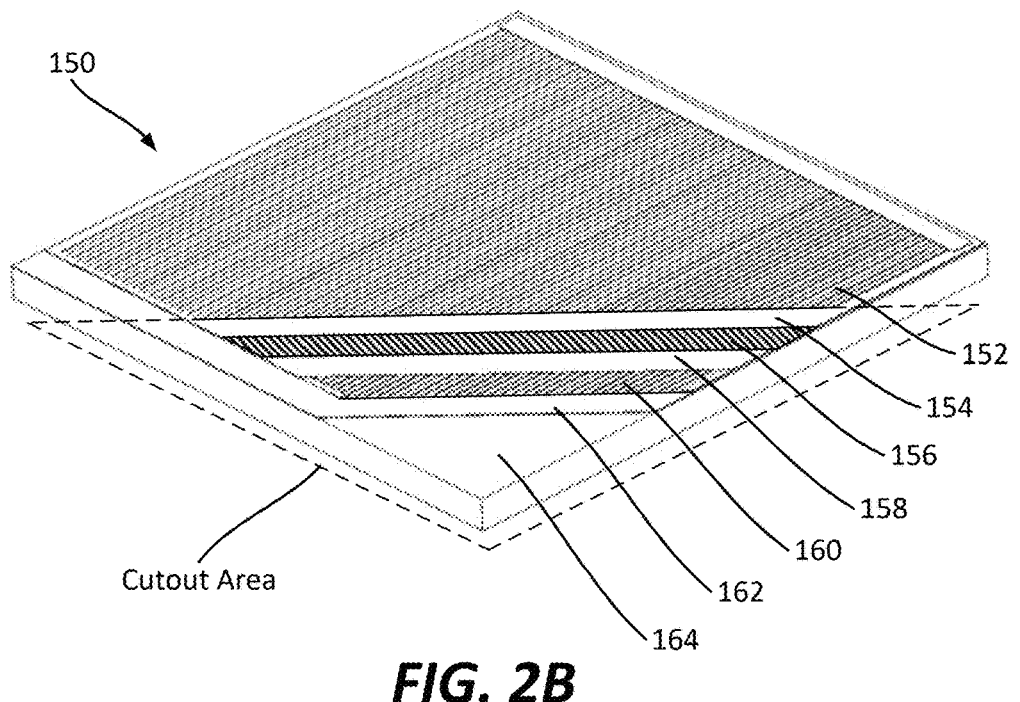
FIG. 2B is a schematic partial cross-sectional view of a TPV module, in accordance with some examples.
Figure 2C:
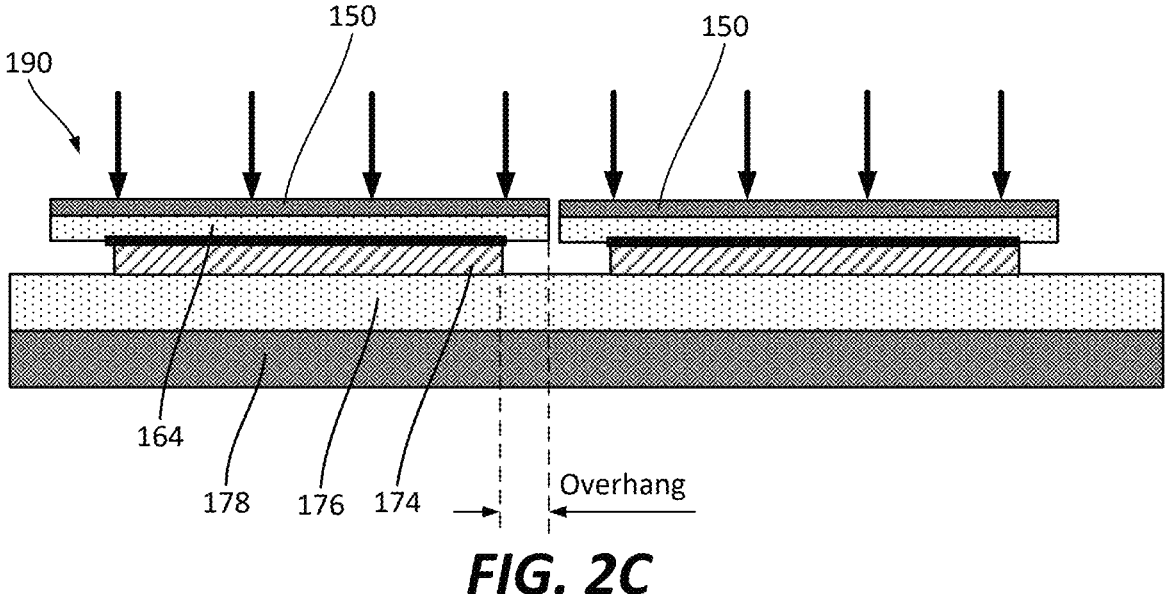
FIGS. 2C and 2D are schematic cross-sectional side views of a TPV module, in accordance with some examples.
Figure 2D:
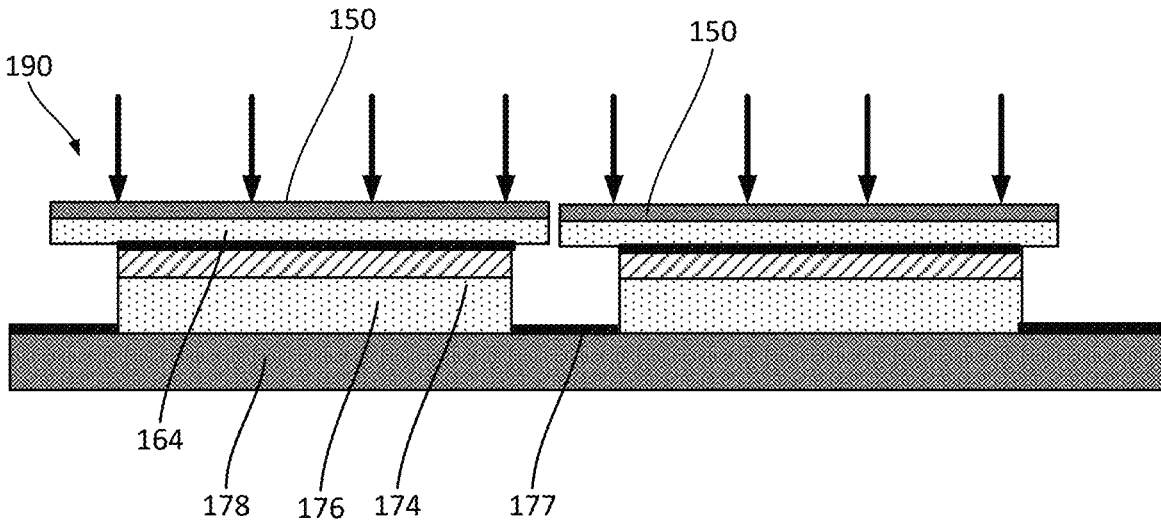

Referring to FIG. 2B, a TPV cell 150 is a semiconductor device that generates electrical power when exposed to light with energy in excess of the characteristic electronic bandgap of the TPV cell 150. A TPV cell 150 may comprise a top contact grid 152, shared with another/adjacent TPV cell 150. For example, a part of the same grid component functions as a top contact grid 152 in one TPV cell 150, while another of this grid component functions as a rear contact grid 160 in another TPV cell 150, thereby interconnecting these two TPV cells 150 in series.

Referring to FIG. 2B, a TPV cell 150 also comprises a top cell portion 154 and a bottom cell portion 158 with an epitaxial tunnel junction 156 positioned in between. These three components may be referred to as an active portion of the TPV cell 150 or, more specifically, an electricity-generating portion. The top cell portion 154 is in contact with the top contact grid 152, while the bottom cell portion 158 is in contact with the rear contact grid 160. In some examples, the TPV cell 150 also comprises a mirror 162, e.g., a planar gold (Au) mirror. The mirror 162 may be used to redirect any unabsorbed light back into the active portion of the TPV cell 150.

Referring to FIG. 2B, a TPV cell 150 may also comprise a mechanical handle 164. The mechanical handle 164 may have a thermal conductance of at least 50 W/m-K, at least 100 W/m-K, or even at least 200 W/m-K. The mechanical handle 164 may be a metal foil or a piece of a semiconductor wafer. A metal foil is less expensive, while a semiconductor handle provides more rigid backing for die bonding and wire bonding. In some examples, the thickness of the mechanical handle 164 is at least 50 μm or, more specifically, 100-200 μm to allow for handling and provide lateral thermal conductance. The rear side of the mechanical handle 164 may be bonded to the conductive pads 174 of the TPV module 170 with a solder or conductive thermal epoxy.

TPV Cores

Figure 3A:
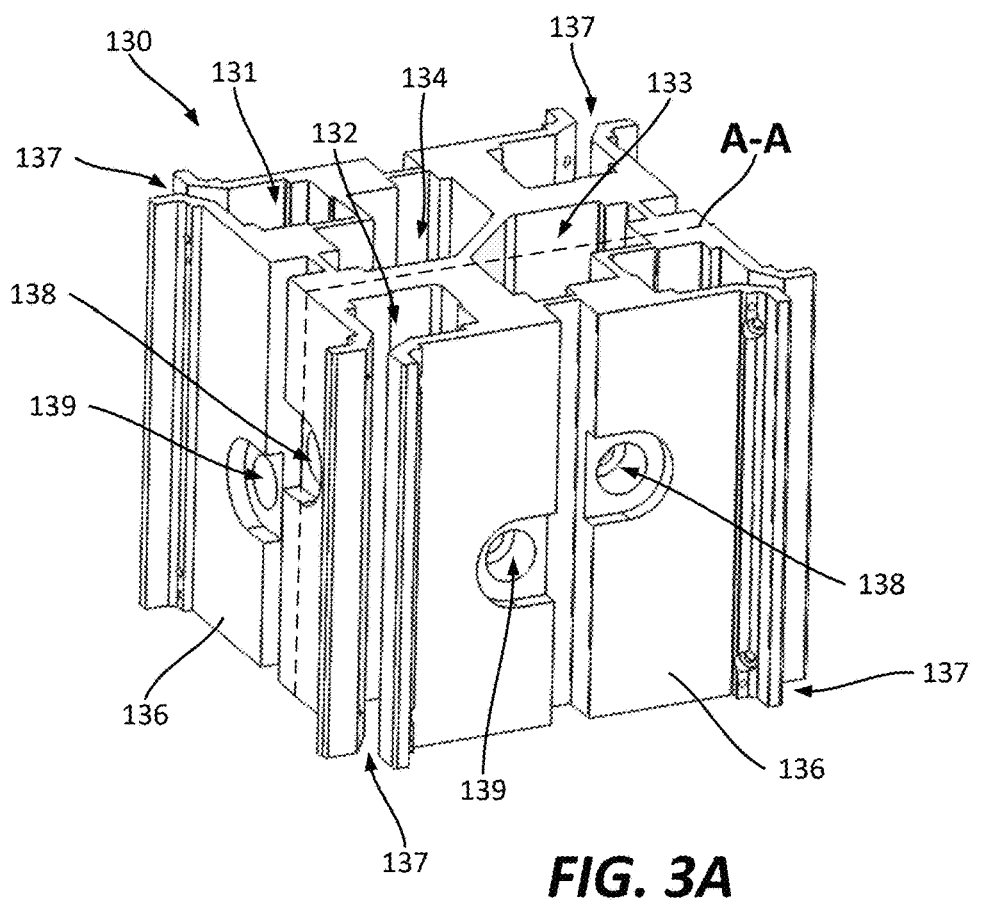
FIGS. 3A and 3B are schematic cross-sectional views of a TPV core, in accordance with some examples.

Each TPV module 170 is mounted (e.g., with a few screws) to a TPV core 130 or, more specifically, to a corresponding core face 136. In some examples, a TPV core 130 comprises a set of gas supply channels 131, a set of gas return channels 132, a coolant supply channel 133, and a coolant return channel 134, each extending along the primary axis 121. For example, FIG. 3A illustrates two gas supply channels 131, positioned at the corners of the TPV core 130 diagonally from each other. FIG. 3A also illustrates two gas return channels 132, also positioned at the corners (different from the corners of the gas supply channels 131) of the TPV core 130 diagonally from each other. Specifically, the TPV core 130 may include gas ports 137 at the corners that engage with gas directors 140 and are also fluidically coupled with gas directors 140.

An inert gas (e.g., argon) is flown into the set of gas supply channels 131 and from these channels into corresponding gas directors 140. These two gas directors 140 generate laminar flow over the surface of the TPV cells 150. The remaining two gas directors 140 receive the gas and remove it into the gas return channels 132. As such, during the operation, the gas supply channels 131 may be maintained at a pressure higher than the environment, while the gas return channels 132 may be operated at a pressure lower than the environment. In some examples, the pressure difference between the outlet and inlet of two corresponding gas directors 140 may be about 0.2-5 psi or, more specifically, 0.4-2 psi. The gas flow velocities may be on 0.1-10 m/s or, more specifically, 0.4-2 m/s.

Overall, the gas is routed to the corners of the TPV receiver 120 in a novel way that facilitates the gas flow over the TPV cells 150 to prevent deposition. Furthermore, the TPV core 130 comprises a cavity for insertion of a busbar interconnecting the TPV modules 170 and carrying the generated power. Specifically, this cavity enables several modules to be attached to the TPV core 130 in either series or parallel, or a combination thereof. In this way, the entire TPV receiver 120 can be assembled cheaply and easily, while facilitating all of the design features needed to achieve the system operational objectives.

Each of the coolant supply channel 133 and the coolant return channel 134 may have a fluidic coupling with each core face 136, e.g., using coolant supply ports 138 and coolant return ports 139. In some examples, the coolant supply ports 138 and the coolant return ports 139 comprise gaskets (e.g., O-rings) to form a liquid-sealed coupling with the back of TPV modules.

Figure 3B:
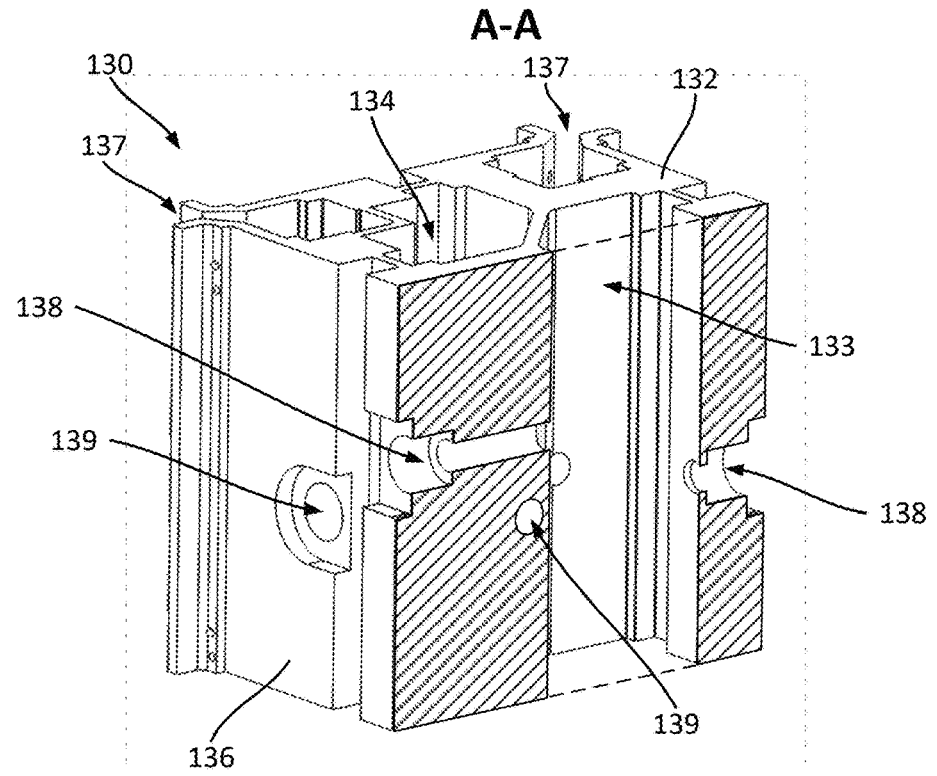

In some examples, a TPV core 130 can be made from extruded aluminum to include the major features needed in the axial direction (e.g., the set of gas supply channels 131, the set of gas return channels 132, the coolant supply channel 133, and the coolant return channel 134). As shown in FIGS. 3A-3B, some post-extrusion machining steps may be used to form various ports, e.g., coolant supply ports 138 and coolant return ports 139.

Gas Directors

In some examples, the TPV receiver 120 comprises gas directors 140, each positioned at and attached to a corresponding corner of the TPV core 130. Each gas director 140 may be aligned with a corresponding gas port 137, which may also be referred to as a gas channel. The gas directors 140 route the gas over the TPV cells 150. Furthermore, the set of gas directors 140 may be operable as a removable insert, thereby minimizing the number of small-featured machining steps required on a large part (i.e., the core extrusion), while also allowing the gas directors to be extruded themselves.

A gas director 140 comprises small channels on the gas directors that can be used to guide the gas along the surface of the TPV cells 150 as a laminar flow while managing the pressure drop considerations and thermal management. Notably, the gas directors 140 may heat up more than the remainder of the TPV core 130, causing the gas directors 140 to thermally expand more tightly into their slots. This tightening can improve thermal contact, lowering the thermal contact resistance, thereby facilitating better cooling.

Coolant Hoses

Figures 4A, 4B, 4C, 5:
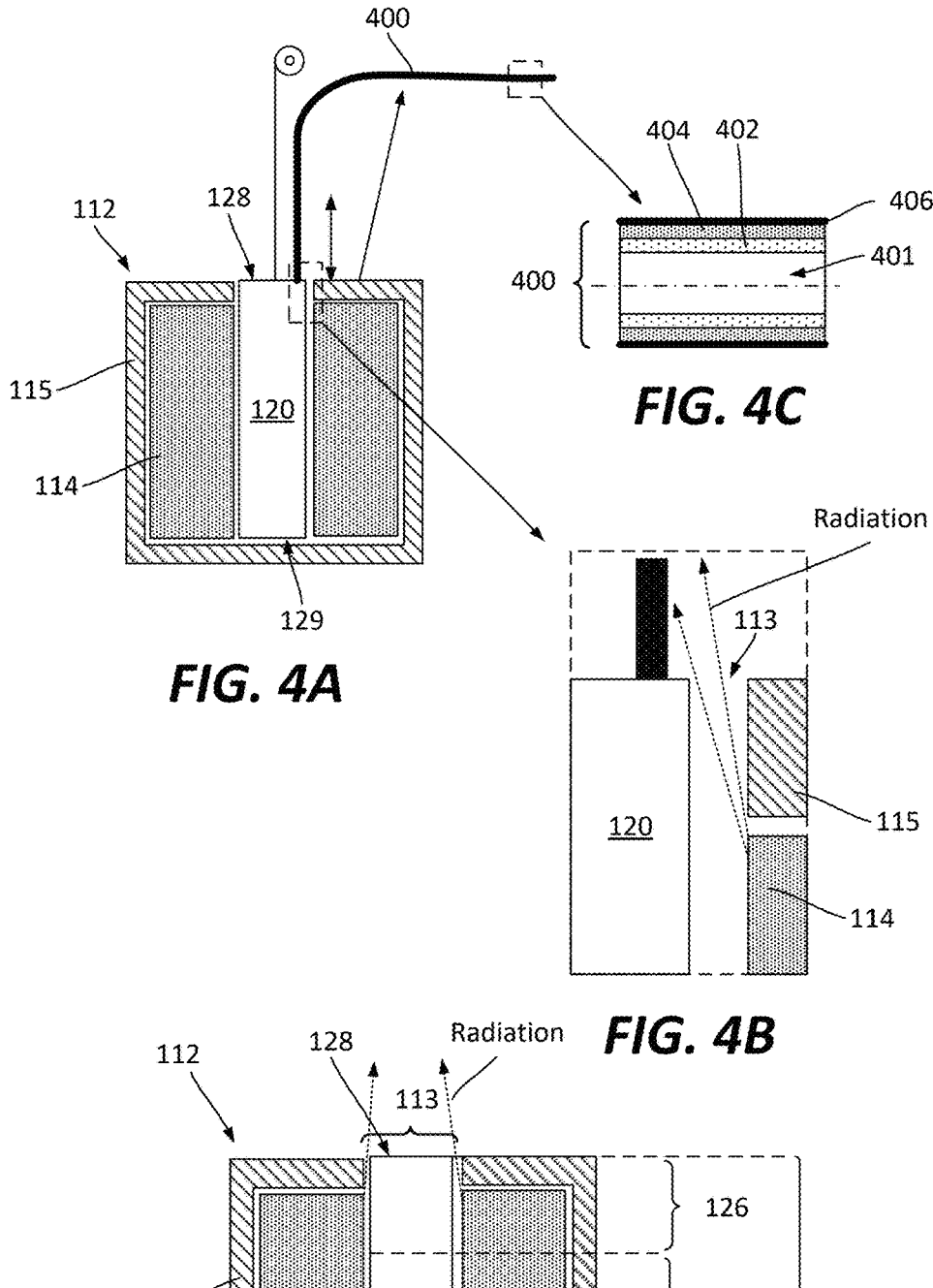
FIGS. 4A-4C are schematic illustrations of a cooling hose used for supplying cooling to the TPV receiver, in accordance with some examples.
FIG. 5 is a schematic cross-sectional view of a TPV unit identifying different zones on the TPV receiver associated with different bandgap TPV cells, in accordance with some examples.

As noted above, the TPV core 130 comprises a coolant supply channel 133 and a coolant return channel 134 that circulates a liquid coolant through the TPV core 130 or, more generally, through the TPV receiver 120. Referring to FIG. 4A, this liquid coolant may be provided using a coolant hose 400 or, more specifically, two coolant hoses 400, one of which is fluidically coupled to the coolant supply channel 133, while the other is fluidically coupled to the coolant return channel 134 at the tailing end 128 of the TPV receiver 120. The coolant supply channel 133 and the coolant return channel 134 are fluidically interconnected (e.g., within the TPV core 130 or using an external coupled at the leading end 129 of the TPV receiver 120. For purposes of this disclosure, the leading end 129 is defined as the end of the TPV receiver 120 first inserted into the cavity of the radiation device 114. The tailing end 128 is opposite of the leading end 129 and is inserted as the last element of the TPV receiver 120 or not inserted (in which case the leading end 129 may protrude outside of the cavity of the radiation device 114).

Referring to FIG. 4A, the TPV unit 112 may comprise a thermally insulating enclosure 115 surrounding the radiation device 114 to minimize heat dissipation from the radiation device 114 to the environment. For example, the radiation device 114 may be heated to temperatures above 1500° C. or even above 1900° C. (to increase the energy storage capacity of the radiation device 114 and also to improve the efficiency of the TPV cells on the TPV receiver 120) while the environment (outside of the TPV unit 112 or, more specifically, outside of the thermally insulating enclosure 115) may be maintained less than 300° C. or less than 200° C. It should be noted that additional insulation layers may be provided that enclose the environment where the thermally insulating enclosure 115 and the coolant hose 400 are positioned.

Referring to FIGS. 4A and 4B, the thermally insulating enclosure 115 may include an enclosure opening 113 through which the TPV receiver 120 is inserted (e.g., lowered) into the cavity of the radiation device 114. The enclosure opening 113 may be slightly larger than the cross-section of the TPV receiver 120 to ensure sufficient clearance between the TPV receiver 120 and the edges of the enclosure opening 113 while inserting and removing the TPV receiver 120 through the enclosure opening 113.

While the operating environment of the coolant hose 400 may be less than 300° C. or less than 200° C., at least some parts of the coolant hose 400 may be subject to radiation leaking from the radiation device 114 (e.g., through the gap between the TPV receiver 120 and the edges of the enclosure opening 113) as shown in FIG. 4B. Furthermore, some convective heat transfer may occur through the gap between the TPV receiver 120 and the edges of the enclosure opening 113 (e.g., with the environment filled with argon at a normal pressure of about 95-105 kPa and being in contact with the radiation device 114 heated to over 1500° C. or even to over 1900° C.). As such, the coolant hose 400 needs to be specially configured to ensure that it can operate in this environment and withstand radiation exposure.

Referring to FIG. 4C, in some examples, the coolant hose 400 comprises a core 402 (forming an opening 401) and a thermal shield 404 surrounding the core 402. In more specific examples, the coolant hose 400 also comprises a reflective skin 406 positioned over the thermal shield 404 such that the thermal shield 404 is between the core 402 and the reflective skin 406. In these examples. The reflective skin 406 forms an external surface of the coolant hose 400. This external surface is exposed to the operating environment of the coolant hose 400. Alternatively, the coolant hose 400 does not have a reflective skin 406 such that the thermal shield 404 is exposed and forms an external surface.

In some examples, the core 402 comprises a polymer, rubber, and/or another flexible material that can provide support to other components of the coolant hose 400 and also can be sufficiently flexible (e.g., able to form a bend radius of less than 1 meter). The internal diameter of the core 402 (defining the opening 401) may be 20-150 mm (e.g., to ensure the flow rate of at least 100 liters per minute or even at least 300 liters per minute). The wall thickness of the core 402 may be 1-10 mm. It should be noted that the core 402 is protected from the environment by at least the thermal shield 404. The liquid coolant temperature may be 0-80° C., e.g., 0-40° C. on the inlet side and 20-80° C. on the outlet side. The coolant hoses 400 used for the inlet and outlet may have the same construction. Water (e.g., with or without additives such as glycol), oil, and other cooling liquids can be used for this purpose. In some examples, the thermal shield 404 comprises graphite felt and graphite-filled materials. In some examples, the thermal shield 404 is embedded into or enclosed by the core 402 (e.g., two parts of the core 402 positioned on different sides of the thermal shield 404). In some examples, the reflective skin 406 comprises one or more of gold, tungsten, and stainless steel.

Multi-Bandgap TPV Cells on One TPV Receiver

Referring to FIG. 5 and as noted above, the TPV receiver 120 comprises a leading end 129 and a tailing end 128 with the tailing end 128 positioned proximate to the enclosure opening 113 when the TPV receiver 120 is fully inserted into the opening of the radiation device 114. Furthermore, as noted above, some radiation may be escaping from the thermally insulating enclosure 115 through the gap between the TPV receiver 120 and the edges of the enclosure opening 113. This escaped radiation reduces the efficiency of the TPV unit 112 and generally needs to be minimized.

Overall, different TPV cells may have different band gaps. For example, a TPV receiver 120 may use TPV cells with higher bandgaps on the receiver portion that is exposed to higher-temperature environments. Conversely, other modules may use TPV cells with lower bandgaps, e.g., positioned on a portion of the TPV cells 150 close to the enclosure opening 113. These TPV cells are used to catch the radiation "spillage" into the enclosure opening 113 (aka a "throat" region). In some examples, different TPV receivers (with different types of cells) may be used for different temperature conditions of the environment. For example, TPV modules with low band gap cells may be used in an emergency backup mode (e.g., the temperature before 1600° C. or even below 1400° C.).

Referring to FIG. 5, in some examples, the TPV receiver 120 can be defined by a leading zone 124 (extending to the leading end 129) and a tailing zone 126 (extending to the tailing end 128). A combination of the leading zone 124 and the tailing zone 126 defines the total length 122 of the TPV receiver 120 (between the tailing end 128 and the leading end 129). In some examples, the leading zone 124 and the tailing zone 126 may be equipped with different types of TPV cells. Specifically, the leading zone 124 may be equipped with TPV cells that have a bandgap of 1 eV+, which may be referred to as a standard bandgap. The tailing zone 126 may be equipped with TPV cells that have a bandgap of 0.3-0.8 eV, which may be referred to as a low bandgap. Low-bandgap TPV cells are configured to absorb more spectra of the emitted radiation (e.g., at least 40%, at least 50%, or even at least 60% of the spectra vs. less than 30% for standard-bandgap TPV cells). It should be noted that TPV cells can be multijunction cells with the above-referenced bandgap values defining the lowest bandgap in the stack. The lower bandgap may be achieved by increasing the indium content in the indium-gallium-arsenide (InGaAs) TPV cells. However, other examples are within the scope.

For example, the total length 122 of the TPV receiver 120 may be between about 1-10 meters or, more specifically, 2-4 meters (e.g., about 3 meters). This length may accommodate 10-100 TPV modules (e.g., shown in FIG. 2A) or, more specifically, 20-40 TPV modules (e.g., about 30 TPV modules), referring to each of the four faces of the TPV receiver 120. Each TPV module may have an array of TPV cells such that all TPV cells in the same TPV module may have the same bandgap. In some examples, the tailing zone 126 represents 5-30% or, more specifically, 10-20% of the total length 122. For example, the first 3-10 TPV modules or, more specifically, the first 4-6 TPV modules (from the tailing end 128 and still referring to each of the four faces of the TPV receiver) may have low-bandgap TPV cells (and represent the tailing zone 126), while the remaining TPV cells (between this tailing zone 126 and the leading end 129 and defining the leading zone 124) may have standard bandgap cells.

Positioning low-bandgap TPV cells next to the tailing end 128 or, more specifically, next to the enclosure opening 113 (when the TPV receiver 120 is fully inserted) allows it to more efficiently absorb the radiation that would otherwise escape from the TPV unit 112. Unlike deeper inside the cavity of the radiation device 114, where any unabsorbed radiation reflects back to the radiation device 114 and effectively bounces back between the radiation device 114 and the TPV receiver 120, some radiation may leak through the gap between the TPV receiver 120 and the edges of the enclosure opening 113 and be lost. In other words, deeper inside the cavity, standard-bandgap TPV cells may be configured to absorb the highest energy wavelengths (thereby boosting the overall efficiency). Closer to the enclosure opening 113, the balance (tradeoff) between recycling and TPV cell efficiency shifts towards efficiency (as some radiation may escape rather than be recycled). One having ordinary skills in the art would recognize that there is a tradeoff between efficiency and power density. As the bandgap increases, TPV cells absorb radiation with a higher energy and shorter wavelength (higher "thermodynamic quality"). It should be noted that, unlike conventional photovoltaic cells that are configured to operate as a single-pass radiation exposure (e.g., any light that is not absorbed is reflected to the environment and lost), the design of the TPV unit 112 provides for continuous recycling of any unabsorbed radiation.

Operating Methods

Figure 6:
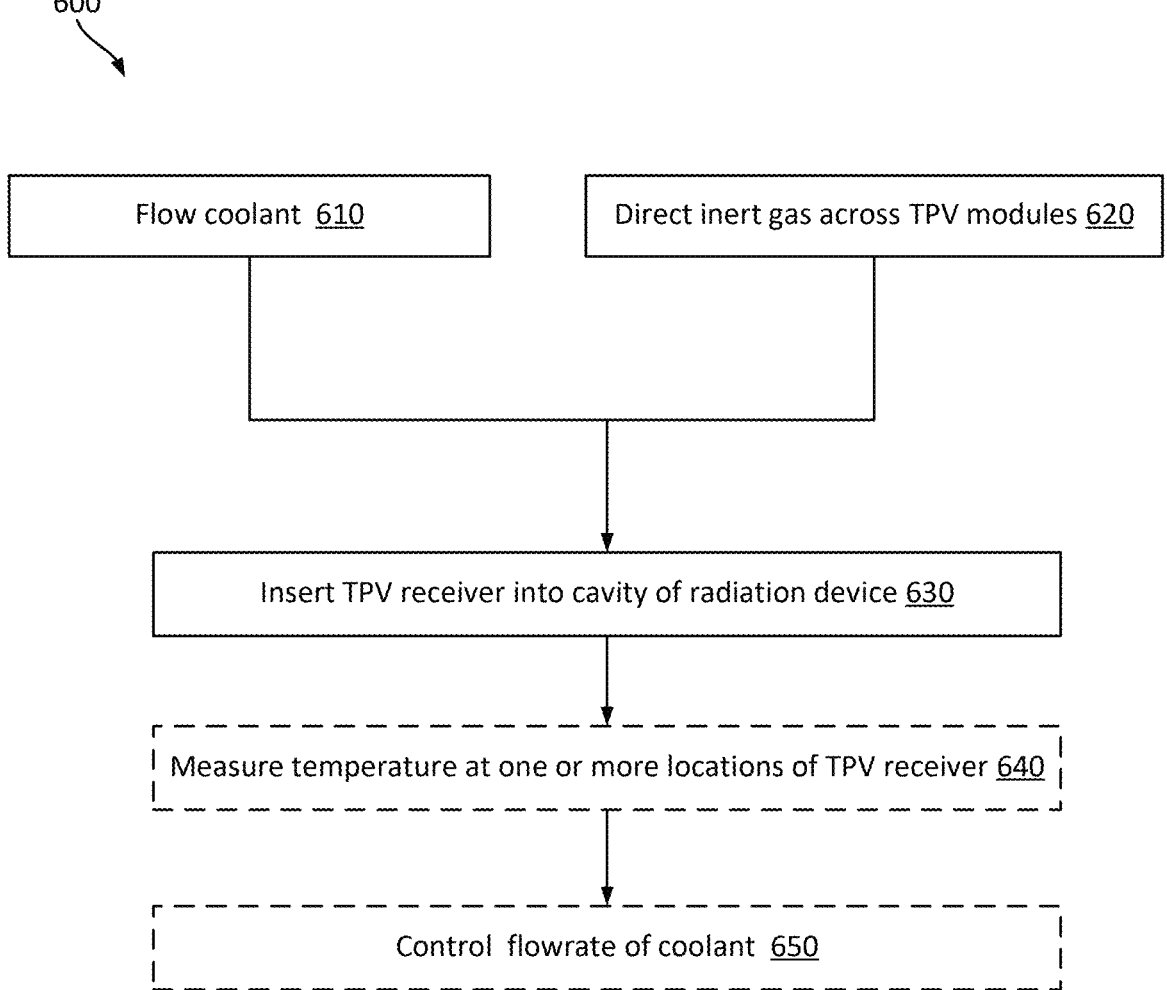
FIG. 6 is a process flowchart corresponding to a method of operating a TPV system, in accordance with some examples.

FIG. 6 is a process flowchart corresponding to a method 600 of operating a TPV system 100, in accordance with some examples. The TPV system 100 comprises a TPV receiver 120 and a radiation device 114. The TPV receiver 120 comprises a TPV core 130 and TPV modules 170 arranged on the TPV core 130 and thermally coupled to the TPV core 130. Additional features and examples of TPV systems 100 are described above.

Method 600 comprises (block 610) flowing a coolant through a coolant supply channel 133 and a coolant return channel 134 in the TPV core 130 to remove heat from the TPV modules 170. The coolant supply channel 133 and coolant return channel 134 are shown in FIGS. 3A and 3B as described above. The coolant helps to maintain the temperature of the TPV core 130 and the TPV modules 170 within the desired temperature range, e.g., the TPV modules 170 are maintained at a temperature below 45° C. while the TPV receiver 120 is inserted into the cavity of the radiation device 114.

In some examples, the coolant is a liquid selected from the group consisting of water, oil, and a glycol-based mixture. Various aspects of selecting the coolant are described above. In some examples, the coolant is supplied into the TPV receiver 120 at a temperature below 40° C., or even below 30° C., thereby providing sufficient heat capacity and temperature gradient (e.g., to maintain the temperature of the TPV modules 170 below 45° C.).

In some examples, further described above, each of the TPV modules 170 comprises a heat sink 180 and a TPV integrated submount assembly 190. The heat sink 180 faces the TPV core 130 and comprises an internal coolant channel 182 fluidically coupled to the coolant supply channel 133 and a coolant return channel 134. The TPV integrated submount assembly 190 comprises TPV cells 150.

In some examples, further described above, the coolant is supplied to and removed from the TPV receiver 120 via coolant hoses 400 comprising a flexible core 402, a thermal shield 404, and an external reflective skin 406. As such, the flexible core 402 is protected from the radiation (leaking from the radiation device 114) and, as a result, from overheating.

Method 600 comprises (block 620) directing an inert gas across the TPV modules 170 using gas directors 140 positioned at corners of the TPV core 130. The inert gas forms a gas curtain over the TPV modules 170, thereby blocking volatile deposition on the TPV modules 170, e.g., as schematically shown in FIG. 1C. The inert gas may be/may comprise argon.

As shown in FIG. 1C, in some examples, the gas directors 140 comprises a first gas director and a second gas director, positioned on adjacent corners of the TPV core 130. The TPV core 130 comprises a gas supply channel 131 and a gas return channel 132. The gas supply channel 131 supplies the inert gas to the first gas director. The gas return channel 132 removes the inert gas received at the second gas director. The inert gas flows across a subset of the TPV modules 170 positioned between the first gas director and the second gas director. Specifically, the gas supply channel 131 is maintained at a pressure higher than ambient. The gas return channel 132 is maintained at a pressure lower than ambient, thereby establishing a directional flow across the subset of the TPV modules 170.

In some examples, (block 620) directing the inert gas operation further comprises regulating a gas flow velocity to minimize turbulence and maintain a substantially uniform laminar gas curtain across the TPV modules 170.

Method 600 comprises (block 630) inserting the TPV receiver 120 into a cavity of the radiation device 114. The radiation device 114 is heated to a temperature of at least 1500° C. or, more specifically, between 1900° C. and 2500° C., thereby emitting radiation within the cavity of the radiation device 114. The TPV modules 170 absorb at least a portion of the radiation, thereby producing electrical power.

In some examples, the TPV system 100 further comprises a storage unit 102, e.g., as shown in FIG. 1A. The radiation device 114 is heated by circulating a liquid metal through the storage unit 102 and the radiation device 114.

In some examples, the TPV receiver 120 comprises a leading zone 124 and a tailing zone 126 along a longitudinal axis 121. The tailing zone 126 is inserted first into the cavity of the radiation device 114 while the tailing zone 126 is positioned closer to an enclosure opening 113. The TPV module 170 comprises a first set of TPV cells 150 positioned at the leading zone 124. The TPV modules 170 further comprise a second set of TPV cells 150 positioned at the tailing zone 126 and offset relative to the first set of TPV cells 150 along the longitudinal axis 121. The second set of TPV cells 150 has a lower bandgap than the first set of TPV cells 150. For example, the second set of TPV cells 150 has a bandgap between 0.3-0.8 eV. The first set of TPV cells 150 has a greater than 1 eV.

In some examples, the TPV modules 170 are maintained at a temperature below 45° C. while the TPV receiver 120 is inserted into the cavity of the radiation device 114.

In some examples, the method 600 further comprises (block 640) measuring temperature at one or more locations of the TPV receiver 120 and (block 650) controlling a flow rate of the coolant based on the temperature measured at the one or more locations of the TPV receiver 120.

In some examples, (block 610) flowing the coolant and (block 620) directing the inert gas are initiated before (block 630) inserting the TPV receiver 120 into the cavity of the radiation device 114, and continue while the TPV receiver 120 remains inserted in the cavity of the radiation device 114.

In some examples, the method further comprises (block 640) measuring temperature at one or more locations of the TPV receiver 120 and (block 650) controlling a flow rate of the coolant based on the temperature measured at the one or more locations of the TPV receiver 120.

Conclusion

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. A thermophotovoltaic (TPV) receiver having a primary axis, the TPV receiver comprising:

a TPV core, wherein:

the TPV core comprises a set of gas supply channels, a set of gas return channels, a coolant supply channel, and a coolant return channel, each extending along the primary axis, the TPV core further comprises core faces, each extending substantially parallel to the primary axis, the TPV core further comprises a set of coolant supply ports and a set of coolant return ports, extending substantially perpendicular to the primary axis, and each of the set of coolant supply ports and the set of coolant return ports extends between and fluidically couples the coolant supply channel and one of the core faces; and TPV modules, each attached to the core faces, wherein:

each of the TPV modules comprises a heat sink and a TPV integrated submount assembly, the heat sink faces the TPV core and comprises an internal coolant channel fluidically coupled to the coolant supply channel and a coolant return channel using the set of coolant supply ports and the set of coolant return ports, thereby allowing to circulate a liquid coolant between the TPV core and the TPV modules, and the TPV integrated submount assembly comprises TPV cells.

2. The TPV receiver of claim 1, wherein each fluidical coupling between the internal coolant channel and one of the set of coolant supply ports and the set of coolant return ports is formed by a rubber gasket shielded from environment by a corresponding one of the TPV modules.

3. The TPV receiver of claim 1, wherein the TPV core is formed from extruded aluminum.

4. The TPV receiver of claim 1, wherein each of the set of gas supply channels, the set of gas return channels, the coolant supply channel, and the coolant return channel are formed from extruding the TPV core.

5. The TPV receiver of claim 1, wherein each of the core faces supports two or more of the TPV modules arranged along the primary axis.

6. The TPV receiver of claim 1, further comprising a leading zone and a tailing zone, offset relative to the leading zone along the primary axis, wherein:

the TPV modules comprise a first set of TPV cells positioned at the leading zone, the TPV modules further comprise a second set of TPV cells positioned at the tailing zone and offset relative to the first set of TPV cells along the longitudinal axis, and the second set of TPV cells has a lower bandgap than the first set of TPV cells.

7. The TPV receiver of claim 6, wherein:

the second set of TPV cells has a bandgap between 0.3-0.8 eV, and the first set of TPV cells has a bandgap greater than 1 eV.

8. The TPV receiver of claim 1, wherein the TPV integrated submount assembly further comprises an integrated submount comprising thermally-conductive pads thermally coupled to TPV cells.

9. The TPV receiver of claim 8, wherein the TPV integrated submount assembly further comprises a dielectric layer supporting the thermally-conductive pads.

10. The TPV receiver of claim 9, wherein the TPV integrated submount assembly further comprises a metal core supporting the dielectric layer and attached to the heat sink.

11. The TPV receiver of claim 8, wherein:

each of the TPV cells comprises a mechanical handle having a thermal conductance of at least 200 W/m-K, and the mechanical handle is bonded to the integrated submount.

12. The TPV receiver of claim 11, wherein the mechanical handle has a thickness of at least 50 micrometers.

13. The TPV receiver of claim 11, wherein the mechanical handle is bonded to the thermally-conductive pads of the integrated submount.

14. The TPV receiver of claim 1, further comprising gas directors, wherein:

each attached to a corresponding corner of the TPV core such that each of the TPV modules is positioned between two of the gas directors, a first one of the two of the gas directors is fluidically coupled to one in the set of gas supply channels, and a second one of the two of the gas directors is fluidically coupled to one in the set of gas return channels.

15. The TPV receiver of claim 14, wherein each of the gas directors is configured to interlock with the corresponding corner of the TPV core.

16. The TPV receiver of claim 14, wherein each of the gas directors comprises a set of gas direction channels offset relative to each other along the primary axis.

17. The TPV receiver of claim 14, wherein the two of the gas directors are configured to generate a laminar flow over the TPV cells of a corresponding one of the TPV modules.

18. The TPV receiver of claim 17, wherein each of the gas directors is configured to generate the laminar flow over the TPV cells of at least two of the TPV modules positioned on different ones of the core faces.

* * * * *